United States Patent
Rahman et al.

(10) Patent No.: US 11,407,904 B2
(45) Date of Patent: Aug. 9, 2022

(54) WATERBORNE POLYURETHANE CONTAINING POLYHEDRAL OLIGOMERIC SILSESQUIOXANE

(71) Applicant: KING FAHD UNIVERSITY OF PETROLEUM AND MINERALS, Dhahran (SA)

(72) Inventors: Mohammad Mizanur Rahman, Dhahran (SA); Md. Hasan Zahir, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/272,632

(22) Filed: Feb. 11, 2019

(65) Prior Publication Data

US 2020/0255674 A1    Aug. 13, 2020

(51) Int. Cl.
    *C09D 5/16*      (2006.01)
    *C09D 175/06*    (2006.01)
    (Continued)

(52) U.S. Cl.
    CPC ......... *C09D 5/1662* (2013.01); *C08G 18/246* (2013.01); *C08G 18/3221* (2013.01); *C08G 18/61* (2013.01); *C08G 18/706* (2013.01); *C08G 18/755* (2013.01); *C09D 7/63* (2018.01); *C09D 7/65* (2018.01); *C09D 175/06* (2013.01); *C08K 5/17* (2013.01); *C08L 83/04* (2013.01)

(58) Field of Classification Search
    CPC ...... C09D 5/1662; C09D 175/06; C09D 7/63; C09D 7/65; C08K 5/17; C08G 18/3221; C08G 18/755; C08G 18/246; C08G 18/706; C08G 18/61
    See application file for complete search history.

(56) References Cited

U.S. PATENT DOCUMENTS

| | | | | |
|---|---|---|---|---|
| 5,830,578 A  * | 11/1998 | Ono | ........................ | G02B 1/14 428/446 |
| 8,716,392 B2 * | 5/2014 | Bartley | ................ | C08G 77/458 524/539 |
| 2013/0029159 A1* | 1/2013 | Kato | ..................... | B05D 7/546 428/447 |

FOREIGN PATENT DOCUMENTS

| | | |
|---|---|---|
| CN | 104341566 A | 2/2015 |
| CN | 106632965 A | 5/2017 |

(Continued)

OTHER PUBLICATIONS

M. Rahman, et al., "Properties of Waterborne Polyurethane Adhesives: Effect of Chain Extender and Polyol Content" Journal of Adhesion Science and Technology, vol. 23, Issue 1, 2009, pp. 1-2 (Abstract Only).

(Continued)

*Primary Examiner* — Robert D Harlan (74) *Attorney, Agent, or Firm* — Oblon, McClelland, Maier & Neustadt, L.L.P.

(57) ABSTRACT

Methods of preparing waterborne polyurethane dispersions involving reacted units of a polyol, an acidic diol, a hydroxy functionalized polyhedral oligomeric silsesquioxane, a diisocyanate, and a chain extender. Polyurethane coatings based on these waterborne polyurethane dispersions are evaluated on their hydrophobicity (water contact angle), mechanical strength (e.g. tensile strength, Young's modulus, elongation at break), and antifouling properties.

12 Claims, 6 Drawing Sheets

(51) Int. Cl.
  *C09D 7/63* (2018.01)
  *C09D 7/65* (2018.01)
  *C08G 18/61* (2006.01)
  *C08G 18/32* (2006.01)
  *C08G 18/75* (2006.01)
  *C08G 18/24* (2006.01)
  *C08G 18/70* (2006.01)
  *C08L 83/04* (2006.01)
  *C08K 5/17* (2006.01)

(56) References Cited

FOREIGN PATENT DOCUMENTS

| CN | 107973894 A | 5/2018 |
|---|---|---|
| CN | 108034349 A | 5/2018 |

OTHER PUBLICATIONS

M. Rahman, et al., "Synthesis and properties of waterborne polyurethane adhesives: effect of chain extender of ethylene diamine, butanediol, and fluoro-butanediol" Journal of Adhesion Science and Technology, vol. 27, Issue 23, 2013, pp. 1-2 (Abstract Only).

S. Subramani, et al., "Chain extension studies of water-borne polyurethanes from methyl ethyl ketoxime/ε caprolactam-blocked aromatic isocyanates" Progress in Organic Coatings, vol. 51, Issue 4, Dec. 20, 2004, pp. 1-2 (Abstract Only).

H. Honarkar, et al., "Synthesis and characterization of polyhedral oligomeric silsesquioxanebased waterborne polyurethane nanocomposites" Korean Journal of Chemical Engineering, vol. 33, Issue 1, Jan. 2016, pp. 1-2 (Abstract Only).

P. Walter, et al., "Assessment of antifouling efficacy of polyhedral oligomeric silsesquioxane based poly (urea-urethane-imide) hybrid membranes" Microbial Biotechnology, vol. 61, Issue 3, Jun. 20, 2015, p. 1 (Abstract Only).

\* cited by examiner

FIG. 7E

WATERBORNE POLYURETHANE CONTAINING POLYHEDRAL OLIGOMERIC SILSESQUIOXANE

STATEMENT OF FUNDING ACKNOWLEDGEMENT

This project was supported by the Deanship of Scientific Research (DSR) at King Fand University of Petroleum and Minerals (KFUPM), Saudi Arabia under project No. SB171008.

BACKGROUND OF THE INVENTION

Technical Field

The present disclosure relates to waterborne polyurethane dispersions having hydroxy functionalized polyhedral oligomeric silsesquioxane, polyurethane films and coatings made therefrom, and methods of producing the waterborne polyurethane dispersions.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Antifouling coatings have long been used to hinder growth of microorganisms on surfaces of ships and marine structures. Use of tributyltin (TBT) has been restricted since 2008 due to marine life toxicity, thus posing significant challenges for the marine antifouling coating industry [Rahman M M, Chun H H, Park H J "Waterborne polysiloxane-urethane-urea for potential marine coatings" Coat Technol 2011; 8: 389-399; Brady R F, "Clean Hulls Without Poisons: Devising and Testing Nontoxic Marine Coatings." (2000) J Coat Technol 2000; 72: 45-56; Champ M A, "A Review of Organotin Regulatory Strategies, Pending Actions, Related Costs and Benefits." Sci. Total Envir 2000; 258: 21-78; Champ M A., "The Need for the Formation of an Independent, International Marine Coatings Board." Mar Poll Bull 1999; 38: 239-246; Yebra D M, Kiil S, Kim D H "Antifouling Technology-past present and future steps towards efficient and environmentally friendly antifouling coatings" Prog Org Coat 2004; 50: 75-104; Evans S M, Birchenough A C, Brancato M S "The TBT Ban: Out of the Frying Pan into the Fire?" Mar Poll Bull 2000; 40: 204-211; Brady R F "Properties which Influence Marine Fouling Resistance in Polymers Containing Silicon and Fluorine." Prog Org Coat 1999; 35: 31-35; and Genzer J, Efimenko K "Recent Developments in Superhydrophobic Surfaces and their Relevance to Marine Fouling: a Review." Biofouling 2006; 22: 339-360]. Since the launch of the restriction in 2008, no replacement antifouling coatings without TBT have been developed that are equally as effective and safe for marine life.

Among the potential non-toxic alternatives, foul release coatings are considered a promising antifouling technology. Low surface energy of foul release coatings often provide easy release of fouling organisms and prevent fouler attachment [Callow M E, Callow J A "Marine Biofouling: a Sticky Problem." Biologist 2002; 49: 1-5; Brady R F, Singer I L "Mechanical Factors Favoring Release from Fouling Release Coatings." Biofouling 2000; 15: 73-81; and Rahman M M, Kim H D "Synthesis and Characterization of Waterborne Polyurethane Adhesives Containing Different Amount of Ionic Groups (I)." J Appl Polym Sci 2006; 102: 5684-5691, each incorporated herein by reference in their entirety]. One of the most promising candidates in this category of coatings is fluoro/siloxane-based polymer coatings. Due to the brittleness of pure siloxanes, combinations of siloxanes with various polymers such as polyurethanes, acrylates, and epoxides, are being tested extensively as marine antifouling coatings [Rahman M M, Hasneen A, Chung I D, Kim H D, Lee W K, Chun J H, "Synthesis and properties of polyurethane coatings: the effect of different types of soft segments and their ratios" Com Interfaces 2013; 20: 15-26; Rath S K, Chavan J G, Sasane S, Jagannath, Patri M, Samui A B, Chakraborty B C, "Two Component Silicone Modified Epoxy Foul Release Coatings: Effect of Modulus, Surface Energy and Surface Restructuring on Pseudobarnacle and Macrofouling Behavior." J Appl Surface Sci 2009; 256: 2440-2446; Barroso T, Temtem M, Casimiro T, Aguiar-Ricardo A, "Antifouling Performance of poly(acrylonitrile)-based membranes: From Green Synthesis to Application" J. Supercritical Fluids 2011; 56: 312-321; and Ahmad S, Gupta A P, Sharmin E, Alam M, Pandey S K "Synthesis, Characterization and Development of High Performance Siloxane-modified Epoxy Paints." Prog. Org. Coat 2005; 54: 248-255, each incorporated herein by reference in their entirety].

Polyurethane-siloxane antifouling coatings have shown good resistance to fouler attachment [Rahman M M, Chun H H, Park H J "Waterborne polysiloxane-urethane-urea for potential marine coatings" Coat Technol 2011; 8: 389-399; and Rahman M M, Hasneen A, Chung I D, Kim H D, Lee W K, Chun J H, "Synthesis and properties of polyurethane coatings: the effect of different types of soft segments and their ratios" Com Interfaces 2013; 20: 15-26, each incorporated herein by reference in their entirety]. One of the primary advantages of polyurethane (PU) is that they may be synthesized using a wide variety of monomers, allowing easy tuning of specific properties. However, this variety complicates appropriate monomer selection and achieving desired monomer ratios. Identification of suitable monomers and optimization of monomer ratios are crucial steps to maximize the mechanical strength of a polymeric coating. It has been previously demonstrated that the performance of PU-siloxane coatings could be improved by strategies including adopting a proper polydimethylsiloxane (PDMS) content, increasing the crystallinity of the bulk polymer with polyester polyols, as well as crosslinking through siloxane groups via sol-gel reactions [Rahman M M, Hasneen A, Chung I D, Kim H D, Lee W K, Chun J H, "Synthesis and properties of polyurethane coatings: the effect of different types of soft segments and their ratios" Corn Interfaces 2013; 20: 15-26; Rath S K, Chavan J G, Sasane S, Jagannath, Patri M, Samui A B, Chakraborty B C, "Two Component Silicone Modified Epoxy Foul Release Coatings: Effect of Modulus, Surface Energy and Surface Restructuring on Pseudobamacle and Macrofouling Behavior." J Appl Surface Sci. 2009; 256: 2440-2446; Barroso T, Temtem M, Casimiro T, Aguiar-Ricardo A, "Antifouling Performance of poly(acrylonitrile)-based membranes: From Green Synthesis to Application" J. Supercritical Fluids 2011; 56: 312-321; Ahmad S, Gupta A P, Sharmin E, Alam M, Pandey S K "Synthesis, Characterization and Development of High Performance Siloxane-modified Epoxy Paints." Prog. Org. Coat 2005; 54: 248-255; and Rahman M M, Chun H H, Park H "Preparation and properties of waterborne polyurethane-silane: A promising antifouling coating" Macro Research 2011; 19: 8-13, each incorporated herein by reference in their entirety]. Despite these recent advances there is still a need to develop more efficient formulations leading to PU coatings with enhanced mechanical strength and antifouling properties.

In view of the forgoing, one objective of the present disclosure is to provide waterborne polyurethane dispersions containing polyhedral oligomeric silsesquioxane, and methods of producing thereof. A further objective of the present disclosure is to provide polyurethane coatings based on the waterborne polyurethane dispersions.

BRIEF SUMMARY OF THE INVENTION

According to a first aspect, the present disclosure relates to a method of preparing a waterborne polyurethane dispersion. The method involves the steps of mixing a polyol and an acidic diol in a solvent to form a mixture; reacting a diisocyanate with the mixture to form an acidic prepolymer; mixing a hydroxy functionalized polyhedral oligomeric silsesquioxane and a base with the prepolymer to form a neutralized prepolymer; and mixing the neutralized prepolymer with a chain extender in water, thereby forming the waterborne polyurethane dispersion.

In one embodiment, the reacting is catalyzed by an organotin compound.

In one embodiment, the polyol is at least one selected from the group consisting of poly(tetramethylene oxide) glycol, polypropylene glycol, and polyethylene glycol.

In one embodiment, the polyol has a number average molecular weight of 500-3,000 g/mol.

In one embodiment, the acidic diol is dimethylol propionic acid, 2,2-bis(hydroxymethyl)butyric acid, or both.

In one embodiment, the diisocyanate is at least one selected from the group consisting of 4,4'-dicyclohexylmethane diisocyanate, isophorone diisocyanate, hexamethylene diisocyanate, methylene diphenyl diisocyanate, and toluene diisocyanate.

In one embodiment, the hydroxy functionalized polyhedral oligomeric silsesquioxane comprises disilanolisobutyl polyhedral oligomeric silsesquioxane.

In one embodiment, the chain extender is a diamine.

In one embodiment, a weight ratio of the polyol to a total weight of the acidic diol, the hydroxy functionalized polyhedral oligomeric silsesquioxane, the diisocyanate, and the chain extender is in a range of 1:1 to 3:1.

In one embodiment, a molar ratio of the polyol to the hydroxy functionalized polyhedral oligomeric silsesquioxane is in a range of 5:1 to 100:1.

In one embodiment, a molar ratio of the acidic diol to a total molar amount of the polyol and the hydroxy functionalized polyhedral oligomeric silsesquioxane is in a range of 1:1 to 3:1.

In one embodiment, a molar ratio of the diisocyanate to a total molar amount of the polyol, the hydroxy functionalized polyhedral oligomeric silsesquioxane, the acidic diol, and the chain extender is in a range of 1:2 to 2:1.

In one embodiment, the waterborne polyurethane dispersion involves a polyurethane containing reacted units of the polyol, the acidic diol, the hydroxy functionalized polyhedral oligomeric silsesquioxane, the diisocyanate, and the chain extender, and 40-80 wt % water relative to a total weight of the waterborne polyurethane dispersion.

According to a second aspect, the present disclosure relates to a waterborne polyurethane dispersion involving a polyurethane containing reacted units of a polyol, an acidic diol, a hydroxy functionalized polyhedral oligomeric silsesquioxane, a diisocyanate, and a chain extender, and 40-80 wt % water relative to a total weight of the waterborne polyurethane dispersion. A weight ratio of the polyol to a total weight of the acidic diol, the hydroxy functionalized polyhedral oligomeric silsesquioxane, the diisocyanate, and the chain extender is in a range of 1:1 to 3:1. A molar ratio of the polyol to the hydroxy functionalized polyhedral oligomeric silsesquioxane is in a range of 5:1 to 100:1. A molar ratio of the acidic diol to a total molar amount of the polyol and the hydroxy functionalized polyhedral oligomeric silsesquioxane is in a range of 1:1 to 3:1. Also, a molar ratio of the diisocyanate to a total molar amount of the polyol, the hydroxy functionalized polyhedral oligomeric silsesquioxane and the acidic diol is in a range of 1:1 to 2:1.

In one embodiment, the polyol is poly(tetramethylene oxide) glycol having a number average molecular weight of 500-3,000 g/mol, the acidic diol is dimethylol propionic acid, the hydroxy functionalized polyhedral oligomeric silsesquioxane is disilanolisobutyl polyhedral oligomeric silsesquioxane, and the diisocyanate is 4,4'-dicyclohexylmethane diisocyanate.

In one embodiment, the weight ratio of the polyol to a total weight of the acidic diol, the hydroxy functionalized polyhedral oligomeric silsesquioxane, the diisocyanate, and the chain extender is in a range of 1.5:1 to 2:1, the molar ratio of the polyol to the hydroxy functionalized polyhedral oligomeric silsesquioxane is in a range of 10:1 to 20:1, and the molar ratio of the acidic diol to a total molar amount of the polyol and the hydroxy functionalized polyhedral oligomeric silsesquioxane is in a range of 1.1:1 to 1.5:1.

According to a third aspect, the present disclosure relates to a polyurethane film involving the waterborne polyurethane dispersion of the second aspect in cured form.

In one embodiment, the polyurethane film has a mean water contact angle of 60°-90°.

In one embodiment, the polyurethane film has a tensile strength of 16-35 MPa, a Young's modulus of 2-10 MPa, and an elongation at break of 850-1,300%.

According to a fourth aspect, the present disclosure relates to an antifouling coated substrate involving a substrate and a layer of the polyurethane film of the third aspect disposed on the substrate. The layer may have a thickness of 50-1,000 μm.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Embodiments of the present disclosure will now be described more fully hereinafter with reference to the accompanying drawings, in which some, but not all embodiments of the disclosure are shown.

The present disclosure may be better understood with reference to the following definitions. As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the words "substantially similar", "substantially the same", "approximately", or "about" may be used when describing magnitude and/or position to indicate that the value and/or position described is within a reasonable expected range of values and/or positions. For example, a numeric value may have a value that is ±1% of the stated value (or range of values), +2% of the stated value (or range of values), ±5% of the stated value (or range of values), ±10% of the stated value (or range of values), or +15% of the stated value (or range of values).

As used herein, the terms "compound" and "product" are used interchangeably, and are intended to refer to a chemical entity, whether in the solid, liquid or gaseous phase, and whether in a crude mixture or purified and isolated.

As used herein, the term "substituted" refers to at least one hydrogen atom that is replaced with a non-hydrogen group, provided that nonviral valencies are maintained and that the substitution results in a stable compound. When a substituent is noted as "optionally substituted", the substituents are selected from the exemplary group including, but not limited to, halo, hydroxy, alkoxy, oxo, alkanoyl, aryloxy, alkanoyloxy, thiol, alkylthio, arylthio, arylalkylthio, alkylthiono, arylthiono, aryalkylthiono, alkylsulfonyl, arylsulfonyl, arylalkylsulfonyl, nitro, cyano, carboxy, carbamyl (e.g. —CONH$_2$), substituted carbamyl (e.g. CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof and the like. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

As used herein, the term "alkyl" unless otherwise specified refers to both branched and straight chain saturated aliphatic primary, secondary, and/or tertiary hydrocarbons of typically C$_1$ to C$_{21}$, for example C$_1$, C$_2$, C$_3$, C$_4$, C$_5$, C$_6$, C$_7$, C$_8$, C$_9$, C$_{10}$, C$_{11}$, C$_{12}$, C$_{13}$, C$_{14}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl.

The term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

As used herein, the term "aryl" unless otherwise specified refers to functional groups or substituents derived from an aromatic ring including, but not limited to, phenyl, biphenyl, napthyl, thienyl, and indolyl. As used herein, the tem optionally includes both substituted and unsubstituted moieties. Exemplary moieties with which the aryl group can be substituted may be selected from the group including, but not limited to, hydroxy, alkoxy, aryloxy, nitro, cyano, sulfonic acid, sulfate, phosphoric acid, phosphate or phosphonate or mixtures thereof. The substituted moiety may be either protected or unprotected as necessary, and as known to those skilled in the art.

The present disclosure is intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}$C and $^{14}$C, isotopes of nitrogen include $^{15}$N, isotopes of oxygen include $^{17}$O and $^{18}$O, and isotopes of silicon include $^{29}$Si and $^{30}$Si. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

One aspect of the present disclosure relates to a waterborne polyurethane dispersion involving a polyurethane containing reacted units of a polyol, an acidic diol, a hydroxy functionalized polyhedral oligomeric silsesquioxane, a diisocyanate, and a chain extender, and 40-80 wt %; water relative to a total weight of the waterborne polyurethane dispersion, preferably 50-75 wt %, preferably 55-70 wt %, preferably 60-65 wt % water relative to a total weight of the waterborne polyurethane dispersion.

As used herein, monomers are molecules which can undergo polymerization, thereby contributing constitutional repeating units to the structures of a macromolecule or polymer matrix. The process by which monomers combine end to end to form a polymer matrix is referred to herein as "polymerization". As used herein, "crosslinking", "cross-linking", "crosslinked", "cross-linked", a "crosslink", or a "cross-link" refers to polymer matrixes containing branches that connect polymer chains via bonds that link one polymer chain to another. The crosslink may be an atom, a group of atoms, or a number of branch points connected by bonds, groups of atoms, or polymer chains. A crosslink may be formed by chemical reactions that are initiated by heat, pressure, radiation, change in pH, etc. with the presence of at least one crosslinking monomer having more than two extension points, which is a monomer having more than two reactive sites.

Polyurethanes are commonly prepared via reactions between a diol, a polyol, or mixtures thereof and a diisocyanate, a polyisocyanate, or mixtures thereof, which lead to formation of carbamate links. In certain embodiments, the polyol having at least two reactive sites (e.g. hydroxy groups) and the acidic diol having two reactive sites (e.g. two hydroxy groups) each function as a monomer and react with the diisocyanate having two reactive sites (e.g. isocyanate groups) as another monomer thereby forming carbamate linkages. An extent of polymerization refers to the proportion of reacted monomers in a polymer backbone, which can be determined by extraction, FT-IR spectroscopy, nuclear magnetic resonance (NMR) spectroscopy, and swelling experiments.

The polyol of the present disclosure may be an organic polyol capable of forming crosslinked polyurethanes. In one embodiment, the polyol is an organic compound containing two or more hydroxy functionalities such as diols, triols, tetraols, and the like. Exemplary organic polyols include, but are not limited to, ethylene glycol, 1,3-propanediol, 1,4-butanediol, 1,5-pentain diol, 1,6-hexanediol, glycerol, trimethylol propane, erythritol, pentaerythritol, xylitol, sorbitol, and mixtures thereof. In another embodiment, the polyol is an oligomer or polymer having at least two hydroxy functionalities. Exemplary oligomeric or polymeric polyols include, but are not limited to, diethylene glycol (DEG), triethylene glycol (TEG), tetraethylene glycol (TETG), polyethylene glycol (PEG), polypropylene glycol (PPG), and poly(tetramethylene oxide) glycol (PTMEG). In a preferred embodiment, the polyol is at least one selected from the group consisting of poly(tetramethylene oxide) glycol, polypropylene glycol, and polyethylene glycol. In a more preferred embodiment, the polyol is poly(tetramethylene oxide) glycol, which is also known as polytetrahydrofuran or poly1,4-butanediol. In one or more embodiments, the polyol of the present disclosure has a number average molecular weight of 250-3,500 g/mol, preferably 500-3,000 g/mol, preferably 750-2,800 g/mol, preferably 1,000-2,600 g/mol, preferably 1,250-2,400 g/mol, preferably 1,500-2, 200 g/mol. In a most preferred embodiment, the polyol is poly(tetramethylene oxide) glycol having a number average molecular weight of 1,500-2,500 g/mol, preferably 1,750-2,250 g/mol, or about 2,000 g/mol.

The acidic diol of the present disclosure may be an organic molecule having two hydroxy groups and at least one carboxyl group attached to a backbone containing 3-12 carbons, 4-10 carbons, or 5-8 carbons. Exemplary acidic dials include, but are not limited to, dimethylol propionic acid, 2,2-bis(hydroxymethyl)butyric acid, and 2,3-dihydroxysuccinic acid. It is equally envisaged that the currently disclosed waterborne polyurethane dispersion may be adapted to include an acidic polyol such as 3-hydroxy-2, 2bis(hydroxymethyl)propionic acid in addition to or in lieu of the acidic diol. Alternatively, ionic dials such as sulfonate diols (e.g. N,N-bis(2-hydroxyethyl)-2-aminoethanesulfonic acid, 2-butene-1,4-diol-2-sulfonic acid) may be used as the acidic polyol. In a preferred embodiment, the acidic diol of the present disclosure is dimethylol propionic acid, 2,2-bis(hydroxymethyl)butyric acid, or both. In a most preferred embodiment, the acidic diol is dimethylol propionic acid.

A silsesquioxane is an organosilicon compound with the empirical formula $RSiO_{1.5}$ where R is hydrogen or an alkyl, alkene, aryl, arylene or other organo-functional group. Silsesquioxanes may have a cage-like structure, most commonly in the faun of a cube, hexagonal prism, octagonal prism, decagonal prism, dodecagonal prism, or opened cage-like structure. The high three-dimensional symmetry and nanometer size make silsesquioxanes building blocks for nanocomposites. The diversity of possible functional groups along with their controlled orientation in three-dimensional space allows for highly tailored nanometer-by-nanometer construction in all three dimensions. Examples of possible silsesquoxanes include, but are not limited to, polyhedral oligosilsesquioxanes (POSS), octasilsesquioxanes of the $[ROSiO_{1.5}]_8$ type and its polymeric derivatives and the $[R\text{-phenylSiO}_{1.5}]_8$ type and its polymeric derivatives.

The chemical reactivity and self-assembling properties of polyhedral oligomericsilsesquioxanes (POSS) facilitate the preparation of nanostructured materials. POSS molecules may be functionalized with reactive moieties, which are capable of forming covalent bonds with to a prepolymeric network. Different reactive POSS have been used in a variety of polymers, such as acrylics, epoxies, polyolefins, polyimides, and polyurethanes. Improved thermal and mechanical properties have been reported when proper amount of POSS was applied in these polymers [Turri S, Levi M "Wettability of Polyhedral Oligomeric Silsesquioxane Nanostructured Polymer Surfaces" Macromolecular Rapid Comn 2005; 26: 1233-1236; and Eisenberg P, Erra-Balsells R, Ishikawa Y, Lucas J C, Nonami H, Williams R J J "Silsesquioxanes Derived from the Bulk Polycondensation of [3-(Methacryloxy)propyl]trimethoxysilane with Concentrated Formic Acid: Evolution of Molar Mass Distributions and Fraction of Intramolecular Cycles" Macromolecules 2002; 35: 1160-1174, each incorporated herein by reference in their entirety]. However, polyurethane containing hydroxy functionalized polyhedral oligomeric silsesquioxane has not been reported.

The hydroxy functionalized polyhedral oligomeric silsesquioxane of the present disclosure may be a polyhedral oligomericsilsesquioxane covalently bonded to at least two hydroxy groups. In one embodiment, the hydroxy functionalized polyhedral oligomeric silsesquioxane is a di-hydroxy functionalized polyhedral oligomeric silsesquioxanes of formula (I)

where each $R_1$ is independently selected from the group consisting of an optionally substituted alkyl, an optionally substituted cycloalkyl, and an optionally substituted aryl. In one embodiment, each $R_1$ has 1-12 carbon atoms, 2-10 carbon atoms, 3-8 carbon atoms, or 4-6 carbon atoms. Preferably, each $R_1$ is an isobutyl. In another embodiment, the hydroxy functionalized oligomeric silsesquioxane is a tri-hydroxy functionalized polyhedral oligomeric silsesquioxanes of formula (II)

where each $R_2$ is independently selected from the group consisting of an optionally substituted alkyl, an optionally substituted cycloalkyl, and an optionally substituted aryl. In one embodiment, each $R_2$ has 1-15 carbon atoms, 2-12 carbon atoms, 3-10 carbon atoms, 4-8 carbon atoms, or 5-7 carbon atoms. Preferably, each $R_2$ is independently selected from the group consisting of ethyl, isobutyl, isooctyl, and phenyl. In a further embodiment, the hydroxy functionalized oligomeric silsesquioxane is a tetra-hydroxy functionalized polyhedral oligomeric silsesquioxanes of formula (III)

where each $R_3$ is independently selected from the group consisting of an optionally substituted alkyl, an optionally substituted cycloalkyl, and an optionally substituted aryl. Preferably, each $R_3$ is a phenyl. In one embodiment, each $R_3$ has 1-15 carbon atoms, 2-12 carbon atoms, 3-10 carbon atoms, 4-8 carbon atoms, or 5-7 carbon atoms.

In a most preferred embodiment, the hydroxy functionalized oligomeric silsesquioxane of the present disclosure is the di-hydroxy functionalized polyhedral oligomeric silsesquioxanes of formula (I) where each $R_1$ is isobutyl (i.e. disilanolisobutyl polyhedral oligomeric silsesquioxane). It is equally envisaged that the currently disclosed waterborne polyurethane dispersion may be adapted to include other hydroxy functionalized polyhedral oligomeric silsesquioxanes such as trans-cyclohexanediolisobutyl-POSS®, 3-hydroxypropylheptaisobutyl-POSS®, and 1,2-propanediolisobutyl-POSS® in addition to or in lieu of the aforementioned compounds of formulae (I), (II), and (III). In certain embodiments, the polyhedral oligomeric silsesquioxane used herein may comprise other reactive groups such as thiol (e.g. mercaptopropylisobutyl-POSS®, mercaptopropylisooctyl-POSS®). In at least one embodiment, the polyhedral oligomeric silsesquioxane used herein is not an amino functionalized polyhedral oligomeric silsesquioxane. Non-limiting examples of amino functionalized polyhedral oligomeric silsesquioxanes include aminopropylisobutyl-POSS, aminopropylisooctyl-POSS, aminoethylaminopropylisobutyl-POSS, and methylaminopropylisobutyl-POSS. The hydroxy functionalized polyhedral oligomeric silsesquioxanes used herein may be available from commercial vendors including, without limitation, Sigma Aldrich, Alfa Aesar, Reade Advanced Materials, and Hybrid. Plastics. Polyhedral oligomeric silsesquioxanes used herein may also be prepared via techniques generally known to those skilled in the art, including acid or base catalyzed hydrolysis and condensation of organotrichlorosilanes, and corner capping technique of incompletely condensed. POSS cubes.

The diisocyanate of the present disclosure may be a compound having two isocyanate groups, in particular, an isocyanate compound used for the synthesis of polyurethane polymers. Exemplary diisothiocyanates include, but are not limited to, isophorone diisocyanate, methylene bis-phenyl isocyanate, trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, dodecamethylene diisocyanate, 2,4,4-trimethylhexamethylene diisocyanate, 4,4'-dicyclohexylmethane diisocyanate, dodecamethylene diisocyanate, 2,4,4-trimethylhexamethylene diisocyanate, 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylene-bis(cyclohexyl isocyanate), 1,4-bis(isocyanate methyl)cyclohexane, 1,4-bis(isocyanate methyl)cyclohexane 1,3-phenylene diisocyanate, 4,4'-diphenyl diisocyanate, 1,4-phenylene diisocyanate, 2,4-tolylene diisocyanate, 2,6-tolylene diisocyanate, 4,4'-toluidine diisocyanate, dianisidine diisocyanate, 4,4'-diphenylether diisocyanate, 1,4-tetramethylxylylene diisocyanate, and 1,3-tetramethylxylylene diisocyanate. In one or more embodiments, the diisocyanate is at least one selected from the group consisting of 4,4'-dicyclohexylmethane diisocyanate, isophorone diisocyanate, hexamethylene diisocyanate, methylene diphenyl diisocyanate, and toluene diisocyanate. It is equally envisaged that the currently disclosed waterborne polyurethane dispersion may be adapted to include polyisocyanate such as 2,4,6-triisocyanate toluene, 1,3,5-triisocyanate benzene, 4,4'-triphenylmethane triisocyanate in addition to or in lieu of the diisocyanate. In a most preferred embodiment, the diisocyanate of the present disclosure is 4,4'-dicyclohexylmethane diisocyanate.

The chain extender of the present disclosure may be a compound having reactive moieties (e.g. hydroxy, amino, thiol) capable of forming a covalent bond with unreacted isocyanate functionalities to complete the polymerizing process. In one or more embodiments, the chain extender is a diamine. Exemplary diamines include, but are not limited to, ethylenediamine (EDA), 1,3-propanediamine, 1,4-butanediamine, 1,5-pentaindiamine, and 1,6-hexanediamine. Alternatively, a chain extender having two or more hydroxy groups such as ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, phenyldiethanolamine, 2,2'-(1,4-phenylenedioxy)diethanol, glycerol, trimethylolpropane, 1,2,6-hexanetriol, triethanolamine, pentaerythritol, and (ethylenedinitrilo)tetra-2-propanol. In a most preferred embodiment, the chain extender of the current disclosure is ethylenediamine.

In at least one embodiment, the polyol is poly(tetramethylene oxide) glycol having a number average molecular weight of 1,500-2,500 g/mol, preferably 1,750-2,250 g/mol, or about 2,000 g/mol, the acidic diol is dimethylol propionic acid, the hydroxy functionalized polyhedral oligomeric silsesquioxane is disilanolisobutyl polyhedral oligomeric silsesquioxane, and the diisocyanate is 4,4'-dicyclohexylmethane diisocyanate.

In one or more embodiments, a weight ratio of the polyol to a total weight of the acidic diol, the hydroxy functionalized polyhedral oligomeric silsesquioxane, the diisocyanate, and the chain extender is in a range of 2:3 to 4:1, preferably 1:1 to 7:2, preferably 3:2 to 3:1, preferably 2:1 to 5:2. However, in certain embodiments, the weight ratio of the polyol to a total weight of the acidic diol, the hydroxy functionalized polyhedral oligomeric silsesquioxane, the diisocyanate, and the chain extender may be less than 2:3 or greater than 4:1.

In one or more embodiments, a molar ratio of the polyol to the hydroxy functionalized polyhedral oligomeric silsesquioxane is in a range of 5:1 to 100:1, preferably 6:1 to 95:1, preferably 7:1 to 90:1, preferably 8:1 to 85:1, preferably 9:1 to 80:1, preferably 10:1 to 75:1, preferably 12:1 to 70:1, preferably 14:1 to 65:1, preferably 16:1 to 60:1, preferably 18:1 to 55:1, preferably 20:1 to 50:1, preferably 24:1 to 45:1, preferably 28:1 to 40:1, preferably 32:1 to 36:1. However, in certain embodiments, the molar ratio of the polyol to the hydroxy functionalized polyhedral oligomeric silsesquioxane may be less than 5:1 or greater than 100:1.

In one or more embodiments, a molar ratio of the acidic diol to a total molar amount of the polyol and the hydroxy functionalized polyhedral oligomeric silsesquioxane is in a range of 2:3 to 4:1, preferably 1:1 to 7:2, preferably 3:2 to 3:1, preferably 2:1 to 5:2. However, in certain embodiments, the molar ratio of the acidic diol to a total molar amount of the polyol and the hydroxy functionalized polyhedral oligomeric silsesquioxane may be less than 2:3 or greater than 4:1.

In one or more embodiments, a molar ratio of the diisocyanate to a total molar amount of the polyol, the hydroxy functionalized polyhedral oligomeric silsesquioxane, the acidic diol, and the chain extender is in a range of 2:5 to 5:2, preferably 1:2 to 2:1, preferably 2:3 to 3:2, or about 1:1. However, in certain embodiments, the molar ratio of the diisocyanate to a total molar amount of the polyol, the hydroxy functionalized polyhedral oligomeric silsesquioxane, the acidic diol, and the chain extender may be less than 2:5 or greater than 5:2.

In a preferred embodiment, the weight ratio of the polyol to a total weight of the acidic diol, the hydroxy functionalized polyhedral oligomeric silsesquioxane, the diisocyanate, and the chain extender is in a range of 1.5:1 to 2:1, preferably 1.65:1 to 1.9:1, or about 1.85:1, the molar ratio of the polyol to the hydroxy functionalized polyhedral oligomeric silsesquioxane is in a range of 10:1 to 20:1, preferably 12:1 to 18:1, more preferably 13:1 to 15:1, the molar ratio of the acidic diol to a total molar amount of the polyol and the hydroxy functionalized polyhedral oligomeric silsesquioxane is in a range of 1.1:1 to 1.5:1, preferably 1.2:1 to 1.4:1, or about 1.35:1, and the molar ratio of the diisocyanate to a total molar amount of the polyol, the hydroxy functionalized polyhedral oligomeric silsesquioxane, the acidic diol, and the chain extender is in a range of 0.8:1 to 1.2:1, preferably 0.9:1 to 1.1:1, or about 1:1.

In a most preferred embodiment, wherein the polyol is poly(tetramethylene oxide) glycol having a number average molecular weight of 1,500-2,500 g/mol, preferably 1,750-2,250 g/mol, or about 2,000 g/mol, the acidic diol is dimethylol propionic acid, the hydroxy functionalized polyhedral oligomeric silsesquioxane is disilanolisobutyl polyhedral oligomeric silsesquioxane, the diisocyanate is 4,4'-dicyclohexylmethane diisocyanate, and the chain extender is ethylenediamine, and wherein the weight ratio of the polyol to a total weight of the acidic diol, the hydroxy functionalized polyhedral oligomeric silsesquioxane, the diisocyanate, and the chain extender is in a range of 1.5:1 to 2:1, preferably 1.65:1 to 1.9:1, or about 1.85:1, the molar ratio of the polyol to the hydroxy functionalized polyhedral oligomeric silsesquioxane is in a range of 10:1 to 20:1, preferably 12:1 to 18:1, more preferably 13:1 to 15:1, the molar ratio of the acidic diol to a total molar amount of the polyol and the hydroxy functionalized polyhedral oligomeric silsesquioxane is in a range of 1.1:1 to 1.5:1, preferably 1.2:1 to 1.4:1, or about 1.35:1, and the molar ratio of the diisocyanate to a total molar amount of the polyol, the hydroxy functionalized polyhedral oligomeric silsesquioxane, the acidic diol, and the chain extender is in a range of 0.8:1 to 1.2:1, preferably 0.9:1 to 1.1:1, or about 1:1.

A further aspect of the present disclosure relates to a method of preparing a waterborne polyurethane dispersion. The method involves the steps of mixing a polyol and an acidic diol in a solvent to form a mixture; reacting a diisocyanate with the mixture to form an acidic prepolymer; mixing an hydroxy functionalized polyhedral oligomeric silsesquioxane and a base with the prepolymer to form a neutralized prepolymer; and mixing the neutralized prepolymer with a chain extender in water, thereby forming the waterborne polyurethane dispersion.

In one or more embodiments, the waterborne polyurethane dispersion is synthesized by the aforementioned polyol, acidic diol, hydroxy functionalized polyhedral oligomeric silsesquioxane, diisocyanate, and the chain extender. For example, the polyol used herein is at least one selected from the group consisting of poly(tetramethylene oxide) glycol, polypropylene glycol, and polyethylene glycol. Preferably, the polyol is poly(tetramethylene oxide) glycol having a number average molecular weight of 500-3,000 g/mol, 1,000-2,500 g/mol, or 1,500-2,000 g/mol. The acidic diol used herein may be dimethylol propionic acid, 2,2-bis(hydroxymethyl)butyric acid, or both. The hydroxy functionalized polyhedral oligomeric silsesquioxane used herein may preferably comprise disilanolisobutyl polyhedral oligomeric silsesquioxane. The diisocyanate used herein may be at least one selected from the group consisting of 4,4'-dicyclohexylmethane diisocyanate, isophorone diisocyanate, hexamethylene diisocyanate, methylene diphenyl diisocyanate, and toluene diisocyanate. Preferably the diisocyanate is 4,4'-dicyclohexylmethane diisocyanate. The chain extender may be a diamine. Preferably, the chain extender is ethylenediamine. In a related embodiment, the weight ratios and molar ratios described in the previous aspect may be applied for the preparation of the waterborne polyurethane dispersion.

The method of making the waterborne polyurethane dispersion involves mixing the polyol and the acidic diol in a solvent to form a mixture. Suitable solvents including, but not limited to, dimethylformamide (DMF), dimethyl sulfoxide (DMSO), tetrahydrofuran (THF), 1,3-dimethyl-2-imidazolidinone, and 1-methyl-2-pyrrolidone (NMP) may be used in the current method. In a preferred embodiment, NMP is used as the solvent. Prior to the mixing step, the aforementioned reagents (i.e. polyol and acidic diol) may be dissolved in the solvent separately to form respective solutions, which are then mixed to form the mixture. In an alternative embodiment, the acidic diol (i.e. dimethylol propionic acid) is dissolved in the solvent to form a first mixture, and the polyol is mixed with the first mixture to form the mixture. The mixing may occur via stirring, shaking, swirling, sonicating, blending, or by otherwise agitating the mixture. In one embodiment, the mixture is stirred by a magnetic stirrer or an overhead stirrer. In a preferred embodiment, the mixture is agitated using a magnetic stirrer at a speed of 100-1,000 rpm, 120-750 rpm, 140-500 rpm, 160-250 rpm, or 175-200 rpm at a temperature of 40-95° C., 45-90° C., 50-85° C., 55-80° C., 60-75° C., or 65-70° C. for 0.1-6 hours, 0.5-3 hours, or 1-2 hours.

The method of making the waterborne polyurethane dispersion also involves reacting the diisocyanate with the aforementioned mixture to form an acidic prepolymer. In one or more embodiments, the reacting is catalyzed by an organotin compound. Certain organotin compounds may function as a mild Lewis acid in accelerating the formation of polyurethane network. Exemplary organotins include, but are not limited to, dibutyltin dilaurate (DBTDL), dibutyltin dioctanoate, dibutyltin diacetate, dibutyltin dichloride, methyltin dichloride, dibutyltin bis(2-ethylhexanoate), and dibutyltin dibutanethiolate. In at least one embodiment, the organotin used herein is not a tributyltin (e.g. tributyltin oxide). Preferably, a weight ratio of the organotin compound to the diisocyanate is in a range of 1:500 to 1:10, preferably 1:400 to 1:50, preferably 1:200 to 1:75, or about 1:100. A reaction mixture comprising the mixture having the polyol and acidic diol in NMP, the diisocyanate and the organotin at the aforementioned ratios may be heated at a temperature of 60-120° C., 65-110° C., 70-100° C., 75-90° C., or 80-85° C. for 0.5-12 hours, 1-8 hours, 2-6 hours, or 3-5 hours. The reaction mixture may be agitated using a magnetic stirrer at a speed of 100-1,000 rpm, 120-750 rpm, 140-500 rpm, 160-250 rpm, or 175-200 rpm. The reacting may be conducted in inert gas (e.g. nitrogen, argon, helium). Also, in some embodiments, the reacting may not be conducted in inert gas, but in a vacuum.

The acidic prepolymer may be mixed with the hydroxy functionalized polyhedral oligomeric silsesquioxane and a base to form a neutralized prepolymer. In one embodiment, the step also includes adding methyl ethyl ketone to the prepolymer to help dissolve and adjust viscosity of the prepolymer. The carboxyl groups of the acidic prepolymer may be neutralized via mixing with the base at a temperature of 30-80° C., 40-75° C., 50-70° C., or 55-65° C. for 0.1-2 hours, 0.25-1 hours, or about 0.5 hour. Non-limiting examples of suitable bases include alkali metal hydroxides, ammonia, primary, secondary and tertiary amines, and pyridine. In a preferred embodiment, the base is a tertiary amine such as, but not limited to, trimethylamine, trimethylamine, tributylamine, tripropylamine, and mixtures thereof. In a most preferred embodiment, triethylamine is used herein as the base.

The method of making the waterborne polyurethane dispersion further involves mixing the neutralized prepolymer with the chain extender in water to form the waterborne polyurethane dispersion. The water may be tap water, distilled water, bidistilled water, deionized water, deionized distilled water, reverse osmosis water, and/or some other water. In one embodiment, the water is bidistilled to eliminate trace metals. Preferably the water is distilled water. Preferably, a weight ratio of the water to a total weight of the polyol, the acidic diol, the hydroxy functionalized polyhedral oligomeric silsesquioxane, and the diisocyanate is in a range of 2:3 to 4:1, preferably 1:1 to 3:1, preferably 3:2 to 5:2, or about 7:3. In one embodiment, the water is mixed with the neutralized prepolymer via vigorous stirring at a speed of 700-3,000 rpm, 800-2,500 rpm, 900-2,000 rpm, 1,000-1,800 rpm, 1,100-1,700 rpm, 1,200-1,600 rpm, or 1,300-1,500 rpm to foil n a dispersion. The chain extender may be mixed with the dispersion at a temperature of 15-60° C., 20-55° C., 25-50° C., 30-45° C., or about 40° C. for 0.5-4 hours, 0.75-2 hours, or about 1 hour. The progress and completion of the chain extending reaction may be monitored via FT-IR, UV-vis, and/or NMR spectroscopies.

In alternative embodiments, the order of mixing and reacting of the aforementioned components can be varied. In one particular alternative embodiment, the diisocyanate is mixed with the hydroxy functionalized polyhedral oligomeric silsesquioxane before reacting with the polyol and the acidic diol. In another alternative embodiment, the prepolymer is used as a pre-made composition and the steps of making the prepolymer are considered an optional step of the current method.

Another aspect of the present disclosure relates to a polyurethane film involving the waterborne polyurethane dispersion of the second aspect in cured form. The waterborne polyurethane dispersion may be applied as a coating to a substrate. The coating may be dried (e.g. air dried) to remove liquids, favor further polycondensation, and thus yield a cured, hard polyurethane film. The waterborne polyurethane dispersion in cured form may have a greater extent of crosslinking than that of the waterborne polyurethane dispersion before curing.

In a preferred embodiment, the waterborne polyurethane dispersion disposed on a substrate is air-dried to reach a cured form. As used herein, "air-dry", "air-drying", or "air-dried" means that the presently disclosed waterborne polyurethane dispersion, following application to a substrate, cures in the presence of air. The air may have a relative humidity of 10-99%, preferably 15-95%, more preferably 20-90%, even more preferably 25-80% and a temperature of −10-120° C., preferably 5-80° C., more preferably 10-60° C., even more preferably 20-40° C. In a related embodiment, the air-dried waterborne polyurethane dispersion may be further cured in a vacuum. In one or more embodiments, the waterborne polyurethane dispersion disposed on a substrate cures within 6 hours-7 days, 12 hours-4 days, 18-48 hours, or about 24 hours via air-drying process.

The water contact angle measurement (CAM) is a very informative tool for evaluating the hydrophilicity/hydrophobicity of coated films. The water contact angle may contribute to the barrier properties of coatings on metal surfaces. Generally, if the water contact angle is smaller than 90°, the coating surface is considered hydrophilic, and if the water contact angle is larger than 90°, the coating surface is considered hydrophobic. In one or more embodiments, the polyurethane film has a mean water contact angle of 60°-90°, 65°-85°, 67°-81°, 69°-79°, 70°-78°, 71°-77°, 73°-76°, or 74°-75°. In one embodiment, the hydrophobicity of the polyurethane film increases with an increasing amount of the hydroxy functionalized polyhedral oligomeric silsesquioxane in the waterborne polyurethane dispersion (see Table 2). The water contact angle of the polyurethane film disclosed herein in any of its embodiments may be greater than that of a polyurethane film based on a substantially identical waterborne polyurethane dispersion devoid of any hydroxy functionalized polyhedral oligomeric silsesquioxanes by 1-10°, 2-9°, 3-8°, 4-7°, or 5-6°.

As used herein, tensile strength is the capacity of a material or structure to withstand tensile loads. In one or more embodiments, the polyurethane film has a tensile strength of 15-40 MPa, preferably 16-35 MPa, preferably 18-32 MPa, preferably 20-30 MPa, preferably 22-28 MPa, preferably 24-26 MPa. The tensile strength of the polyurethane film disclosed herein in any of its embodiments may be greater than that of a polyurethane film based on a substantially identical waterborne polyurethane dispersion devoid of any hydroxy functionalized polyhedral oligomeric silsesquioxanes by 5-12 MPa, 6-11 MPa, 7-10 MPa, or 8-9 MPa (see Table 2).

Figure 4:
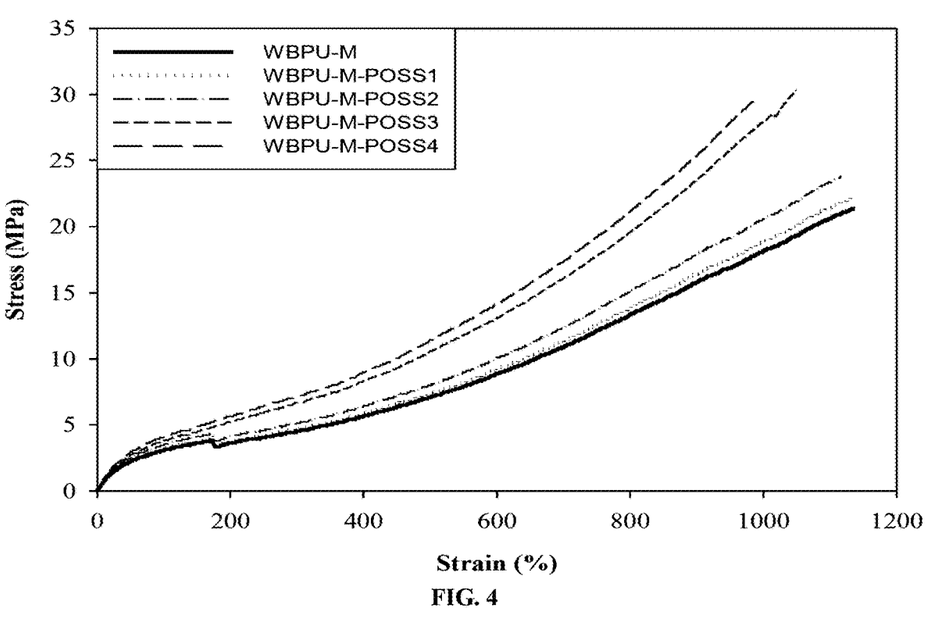
FIG. 4 is an overlay of stress-strain curves of different waterborne polyurethane dispersions (WBPU-M-POSS-1, WBPU-M-POSS-2, WBPU-M-POSS-3, and WBPU-M-POSS-4) prepared using various amounts of disilanolisobutyl POSS as well as a waterborne polyurethane dispersion (WBPU-M) prepared in the absence of POSS.

Young's modulus is a mechanical property that measures the stiffness or rigidity of a solid material, which may be determined from the stress-strain curve (see FIG. 4). In one or more embodiments, the polyurethane film has a Young's modulus of 2-12 MPa, preferably 3-10 MPa, preferably 4-9 MPa, preferably 5-8 MPa, preferably 6-7 MPa. The Young's modulus of the polyurethane film disclosed herein in any of its embodiments may be greater than that of a polyurethane film based on a substantially identical waterborne polyurethane dispersion devoid of any hydroxy functionalized polyhedral oligomeric silsesquioxanes by 0.1-5 MPa, 0.5-4 MPa, 1-3 MPa, or 1.5-2.5 MPa (see Table 2).

Elongation at break or elongation measures ductility of a material. It is often expressed as a percentage of the length at breakage relative to the initial length of the specimen. In one or more embodiments, the polyurethane film has an elongation at break of 850-1,300%, preferably 875-1,250%, preferably 900-1,200%, preferably 925-1,175%, preferably 950-1,150%, preferably 975-1,125%, preferably 1,000-1,100%, preferably 1,025-1,075%, preferably 1,050-1065% (see Table 2).

A further aspect of the present disclosure relates to an antifouling coated substrate, such as the hull of a boat and other structures exposed to marine life and/or immersed in water, involving a substrate and a layer of the polyurethane film disposed on the substrate. Examples of substrates that may be coated according to the current disclosure include, but are not limited to, plastics such as polyvinyl chloride (PVC), polyethylene, sodium polyacrylate, polycarbonate, polyurethane, polymethacrylate, and polystyrene, aluminum, copper, magnesium, and alloys thereof, carbon steel such as mild steel or low-carbon steel, medium-carbon steel, high-carbon steel, and ultra-high-carbon steel, alloy steel, stainless steel, austenitic steel, ferritic steel, martensitic steel, tool steel, and mixtures thereof, glass, wood, ceramics, and concrete. In a preferred embodiment, the substrate comprises PVC. Preferably, the layer may have a thickness of 50-1,000 μm, preferably 100-750 μm, preferably 200-500 μm. However, in certain embodiments, the thickness of the polyurethane film may be less than 50 μm or greater than 1,000 μm.

The examples below are intended to further illustrate protocols for preparing, characterizing the waterborne polyurethane dispersions and the polyurethane films made therefrom, and uses thereof, and are not intended to limit the scope of the claims.

Example 1

Materials and Methods

Poly(tetramethylene oxide) glycol (PTMG, Mn=2000, Sigma Aldrich, St. Louis, Mo., USA) was vacuum dried at 90° C. for three hours prior to use. Triethylamine (TEA, Sigma Aldrich), N-methyl-2-pyrrolidone (NMP, Sigma Aldrich), 4,4-dicyclohexylmethane diisocyanate ($H_{12}$MDI, Sigma Aldrich), and ethylene diamine (EDA, Sigma Aldrich) were used after dehydration with 4 Å molecular sieves for seven days. Dimethylolpropionic acid (DMPA, Sigma Aldrich), and dibutyltindilaurate (DBTDL, Sigma Aldrich) were used as received. Disilanolisobutyl POSS was purchased from Hybrid Plastics, USA.

Example 2

Preparation of WBPU and WBPU-POSS Dispersions

Figure 1:
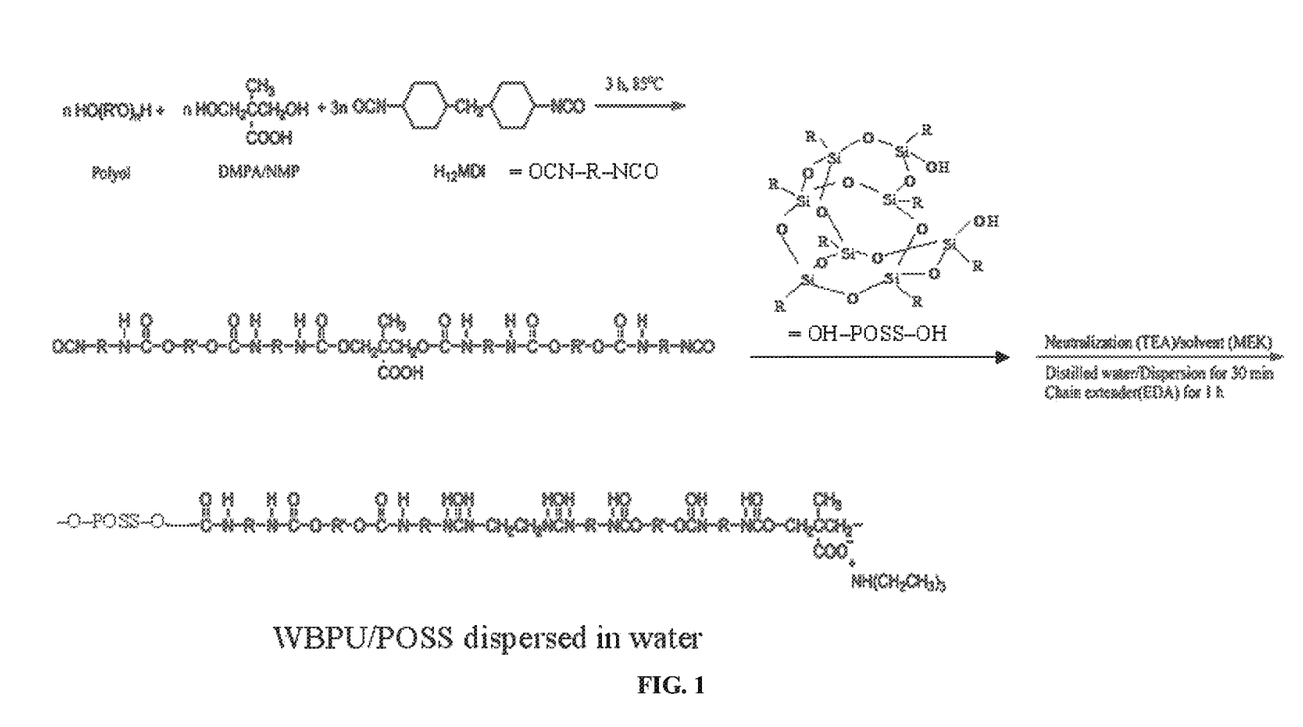
FIG. 1 is an illustrative scheme showing the preparation of a waterborne polyurethane dispersion using disilanolisobutyl polyhedral oligomeric silsesquioxane (POSS).

The prepolymer backbones of WBPU and WBPU-POSS dispersions were synthesized through a prepolymer mixing process [Rahman M M, Hasneen A, Chung I D, Kim H D, Lee W K, Chun J H, "Synthesis and properties of polyurethane coatings: the effect of different types of soft segments and their ratios" Com Interfaces 2013; 20: 15-26, incorporated herein by reference in its entirety] (FIG. 1). Different POSS contents were used during the synthesis (see Table 1). The polyol PTMG was placed in a four-necked flask that was equipped with a thermometer, a stirrer, a condenser, an inlet and outlet for dry nitrogen, and the system was degassed under vacuum at 90° C. for 30 min. DMPA/NMP (1/1 w/w) was added to the mixture at 65° C. and continued to stirring for 30 min. The reaction was allowed to cool to 45° C. under moderate stirring (175~200 rpm). Then dibutyltin dilaurate (0.01 wt % based on $H_{12}$MDI) was added to the flask along with $H_{12}$MDI, and the mixture was heated to 85° C. under moderate stirring (175~200 rpm) and reacted for 3 h. The change in the NCO value during the reaction was determined using the standard dibutylamine back-titration method (ASTM D 1638). Methyl ethyl ketone (MEK, 10 wt %) was then added to the NCO-terminated prepolymer mixture at 65° C. in order to adjust the viscosity of the solution. For the synthesis of WBPU-POSS, the POSS was added to prepolymers. TEA was also added to the reaction mixture at 65° C. in order to neutralize the carboxyl groups of the NCO-terminated prepolymer. After 30 min of neutralization, distilled water (70 wt %) was added to the reaction mixture at 25° C. with vigorous stirring (1300~1500 rpm). The neutralized prepolymer was chain-extended by adding EDA (mixed with water) dropwise at 40° C. for a period of 1 h, and the reaction continued until the NCO peak (2000-2300 $cm^{-1}$) in the IR spectrum had completely disappeared. The dispersions were obtained (30 wt % solid content) after MEK was evaporated and collected separately.

TABLE 1

Sample designation and composition of WBPU and WBPU-POSS coatings

| Sample Designation | Composition (Mole) | | | | | | PTMG (wt %) |
|---|---|---|---|---|---|---|---|
| | PTMG | POSS | DMPA | $H_{12}$MDI | TEA | EDA | |
| WBPU-L | 0.030 | — | 0.054 | 0.103 | 0.054 | 0.019 | 59 |
| WBPU-L-POSS-1 | 0.0293 | 0.0007 | 0.054 | 0.103 | 0.054 | 0.019 | 59 |
| WBPU-L-POSS-2 | 0.0286 | 0.0014 | 0.054 | 0.103 | 0.054 | 0.019 | 59 |
| WBPU-L-POSS-3 | 0.0279 | 0.0021 | 0.054 | 0.103 | 0.054 | 0.019 | 59 |
| WBPU-L-POSS-4 | 0.0272 | 0.0028 | 0.054 | 0.103 | 0.054 | 0.019 | 59 |

TABLE 1-continued

Sample designation and composition of WBPU and WBPU-POSS coatings

| Sample Designation | Composition (Mole) | | | | | | PTMG (wt %) |
| --- | --- | --- | --- | --- | --- | --- | --- |
| | PTMG | POSS | DMPA | $H_{12}$MDI | TEA | EDA | |
| WBPU-M | 0.040 | — | 0.054 | 0.113 | 0.054 | 0.019 | 65 |
| WBPU-M-POSS-1 | 0.0393 | 0.0007 | 0.054 | 0.113 | 0.054 | 0.019 | 65 |
| WBPU-M-POSS-2 | 0.0386 | 0.0014 | 0.054 | 0.113 | 0.054 | 0.019 | 65 |
| WBPU-M-POSS-3 | 0.0379 | 0.0021 | 0.054 | 0.113 | 0.054 | 0.019 | 65 |
| WBPU-M-POSS-4 | 0.0372 | 0.0028 | 0.054 | 0.113 | 0.054 | 0.019 | 65 |
| WBPU-H | 0.050 | — | 0.054 | 0.123 | 0.054 | 0.019 | 69 |
| WBPU-H-POSS-1 | 0.0493 | 0.0007 | 0.054 | 0.123 | 0.054 | 0.019 | 69 |
| WBPU-H-POSS-2 | 0.0486 | 0.0014 | 0.054 | 0.123 | 0.054 | 0.019 | 69 |
| WBPU-H-POSS-3 | 0.0479 | 0.0021 | 0.054 | 0.123 | 0.054 | 0.019 | 69 |
| WBPU-H-POSS-4 | 0.0472 | 0.0028 | 0.054 | 0.123 | 0.054 | 0.019 | 69 |

Example 3

Preparation of WBPU and WBPU-POSS Films

All the films were prepared by pouring the aqueous dispersion (10 g) onto a Teflon disk (7 cm in diameter), and drying the dispersion under ambient conditions for about 48 hours. The films (typically about 0.5 mm thick) were dried at 60° C. for 6 hours and then vacuum dried for additional 12 hours. The vacuum dried films were stored in a desiccator at room temperature.

Example 4

Coating onto PVC Sheet

The synthesized coating solution was coated onto the PVC sheet through an autocoater. The thickness of the wet coating was 100 μm. All coatings were dried at room temperature, and then oven dried at 70° C. for 24 h to remove the solvent.

Example 5

Characterization

FT-IR spectroscopy (Impact 400D, Nicolet, Madison, Wis., USA) was used to characterize the PU polymer.

$^{29}$Si-NMR spectra were obtained on a JEOL C60 HL spectrometer with $CDCl_3$ as the solvent.

The mechanical properties were measured at room temperature using a United Data System tension meter (Instron SSTM-1, United Data Systems, Japan) according to the ASTM D 638 specifications. A crosshead speed of 50 mm/min was used throughout these investigations in order to determine the ultimate tensile strength, the Young's modulus and the elongation at break (%) for all samples. The values were reported as an average of five measurements.

The polymer surface was analyzed by XPS using an ESCA 250 X-ray Photoelectron Spectrometer (XPS) (UK) using Al K (1486.6 eV).

For the swelling study, all films were immersed in water for 48 h at 30° C. and the swelling (%) was determined by the weight increase according to equation 1 [Rahman M M, Kim H D "Synthesis and Characterization of Waterborne Polyurethane Adhesives Containing Different Amount of Ionic Groups (I)." J Appl Polym Sci 2006; 102: 5684-5691, incorporated herein by reference in its entirety]:

$$\text{Swelling (\%)} = (W - W_0/W_0) \times 100 \quad (1)$$

where $W_0$ is the weight of the dried film and W is the weight of the film at equilibrium swelling.

A Theta Optical tensiometer (Attension, Biolin Scientific, Helsinki, Finland) was used to analyze the water contact angle of the coatings.

Self-polishing and delamination test was done at a dynamic condition under artificial salt water (3%) based on a previous report [Kim B W, Kang T W, Park H, Lee I W, Chun H H, Jo N J "Self polishing behavior of zinc based copolymer with different monomer composition" Mac Res 2014, 9: 978-982, incorporated herein by reference in its entirety]. The result was determined by the reduction of film thickness. The specimens were attached to outer vertical surface of the rotor in order to confirm film condition. Each experiment was repeated three times and the average value was counted.

The antifouling tests were performed for 3 months according to the ASTM D3623 specifications in Suyeong Beach, Busan, South Korea. The coatings on PVC supports were immersed into the sea water and the antifouling performance of coatings was observed. Periodically, the samples were removed and photographed.

Example 6

Results and Discussions

Figure 2:
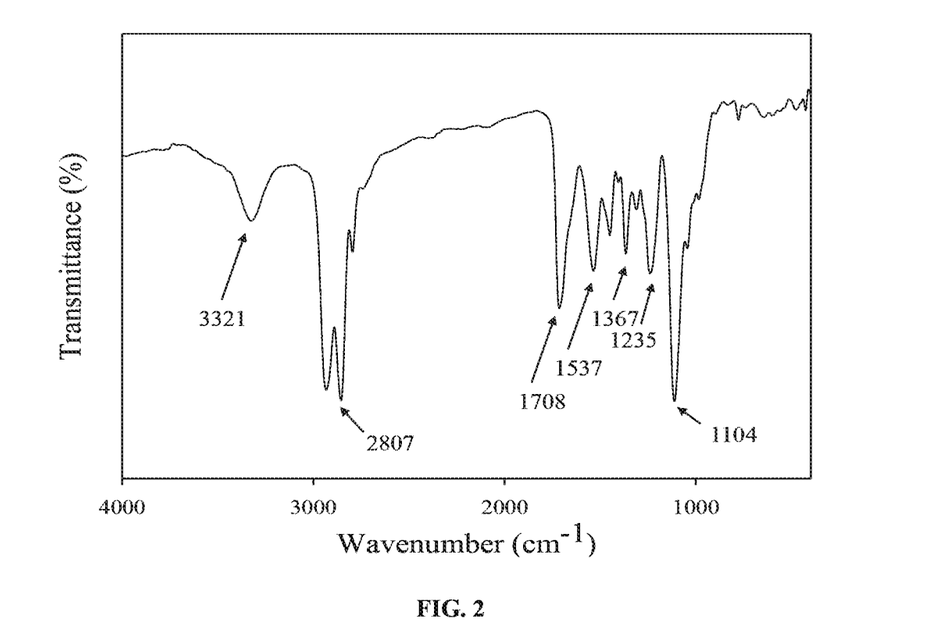
FIG. 2 is an FT-JR spectrum of a waterborne polyurethane dispersion prepared using disilanolisobutyl POSS.
Figure 3:
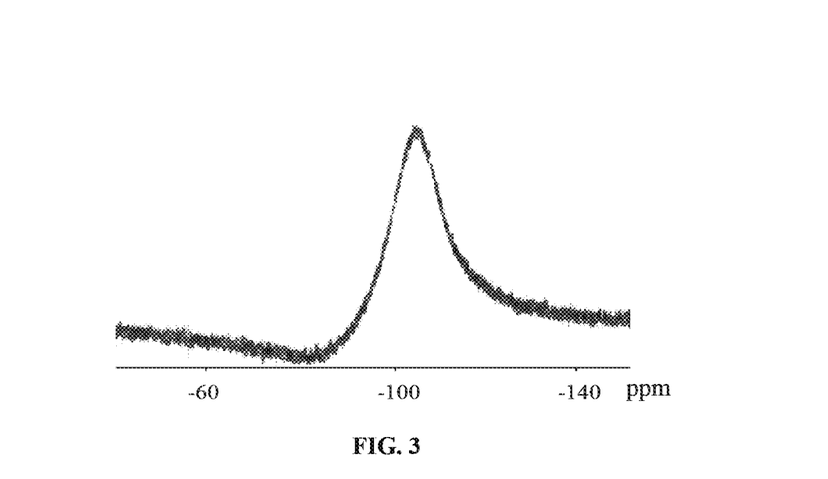
FIG. 3 is a $^{29}Si$ NMR spectrum of a waterborne polyurethane dispersion (WBPU-M-POSS3) prepared using disilanolisobutyl POSS.

The coating designations and compositions are summarized in Table 1. Dispersions having different POSS contents and different WBPU compositions were prepared and analyzed. All WBPU-POSS dispersions were identified via the IR peaks of characteristic functional groups (FIG. 2). The absence of peaks for isocyanate groups in the range of 2000-2300 $cm^{-1}$ indicated that all isocyanate groups were fully reacted [Rahman M M, Chun H H, Park H J "Waterborne polysiloxane-urethane-urea for potential marine coatings" Coat Technol 2011; 8: 389-399, incorporated herein by reference in its entirety]. The spectrum is characterized by the bands at 3150-3600 $cm^{-1}$, 2800-3000 $cm^{-1}$, 2795 $cm^{-1}$, and 1109 $cm^{-1}$, which correspond to NH, CH, O—$CH_2$, and C—O—C stretching and its ether group, respectively. Additionally, bands at 1600-1760 $cm^{-1}$ and 1540 $cm^{-1}$ are attributed to the amide I and amide II of C=O group, respectively. A very weak single band is observed at 833 $cm^{-1}$, which is attributed to either the coupled vibrations of the C—O stretching or $CH_2$ rocking modes. A strong band assigned to the asymmetric stretching vibration of the C—N group is expected at 1040 $cm^{-1}$; however, this band overlaps with a very strong band at 1109 $cm^{-1}$, which corresponds to the C—O—C stretching vibration of the ether groups in the PU films. It was also observed (not shown) that there were no noticeable differences between the FTIR spectra of the WBPU-POSS with different POSS contents and different WBPU compositions. $^{29}$Si-NMR (FIG. 3) was utilized to identify the POSS in WBPU-POSS films. A peak at −112.34 ppm corresponding to the silicon atom [Rahman M M, Chun H H, Park H J "Waterborne polysiloxane-urethane-urea for potential marine coatings" Coat Technol 2011; 8: 389-399, incorporated herein by reference in its entirety] was observed for all WBPU-POSS films.

Both the water contact angle and water swelling (%) tests were peach led to characterize the hydrophilicity of the coatings. These results are summarized in Table 2. The coatings tended to swell with water at different rates. For water swelling, the WBPU-POSS with higher POSS content showed the lowest swelling (%) character, whereas, the pristine WBPU film showed a maximum swelling (A) in all three series. The less swelling (%) value of WBPU-POSS coatings implies that the POSS offers a strong barrier to water penetration and increases the hydrophobicity of coatings. As expected, the water contact angle exhibited the opposite order. The trend was similar for all three series, however, the water swelling and water contact angle values also depend on the PTMG content, the hydrophilicity decreased with increasing PTMG content. This might be due to a decreasing carboxyl acid salt content resulted from an increasing PTMG content.

in the WBPU. A less increased tensile strength and Young's modulus were recorded at higher POSS content might be due to the segregation of POSS in the WBPU-POSS films. Although the trend was similar for all three series, higher tensile strength and Young's modulus values were observed for the L series comparing to those for the M and H series at fixed POSS concentrations. This might be due to the higher content of carboxyl acid salt groups in L series.

Figure 5:
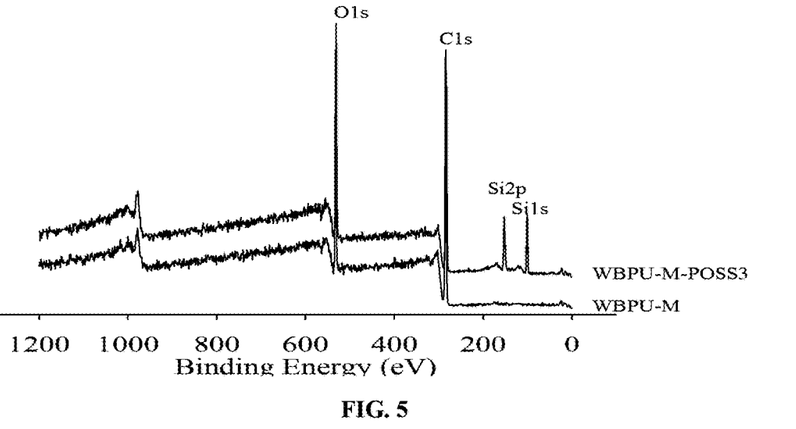
FIG. 5 is an overlay of X-ray photoelectron spectra (XPS) of waterborne polyurethane dispersions WBPU-M-POSS-3 and WBPU-M.

X-ray photoelectron spectroscopy (XPS) was employed to investigate the chemical compositions of the film surface as a function of POSS content. The peaks at 531 and 285 eV correspond to oxygen (1s) and carbon (1s), respectively. These two peaks were observed in all coatings. In WBPU-POSS coatings, two peaks at 101 (silicon (1s)) and 150 (silicon (2p)) eV were also recorded which confirmed the presence of Si on the surface of those coatings (see FIG. 5). It is known that the structure of WBPUs is very complicated due to the presence of soft segments (i.e., rubbery states) and hard segments (i.e., glassy states). These soft and hard segments have different surface free energies, resulting in

TABLE 2

Water swelling (%), water contact angle (°) and mechanical properties of coatings

| Coating | Water swelling (%) | Water contact angle (°) | Tensile strength (MPa) | Young's modulus (MPa) | Elongation at break (%) |
|---|---|---|---|---|---|
| WBPU-L | 11.0 | 65 | 24 | 4 | 950 |
| WBPU-L-POSS-1 | 10.0 | 65 | 25 | 4 | 947 |
| WBPU-L-POSS-2 | 9.0 | 66 | 27 | 5 | 939 |
| WBPU-L-POSS-3 | 8.0 | 67 | 31 | 7 | 902 |
| WBPU-L-POSS-4 | 8.5 | 68 | 32 | 8 | 877 |
| WBPU-M | 9.0 | 72 | 21 | 3 | 1136 |
| WBPU-M-POSS-1 | 8.5 | 73 | 22 | 3 | 1134 |
| WBPU-M-POSS-2 | 8.0 | 74 | 24 | 4 | 1117 |
| WBPU-M-POSS-3 | 7.0 | 76 | 30 | 6 | 1049 |
| WBPU-M-POSS-4 | 6.5 | 78 | 30 | 7 | 990 |
| WBPU-H | 6.0 | 77 | 19 | 2 | 1190 |
| WBPU-H-POSS-1 | 5.5 | 78 | 20 | 2 | 1183 |
| WBPU-H-POSS-2 | 5.0 | 79 | 21 | 3 | 1175 |
| WBPU-H-POSS-3 | 4.0 | 80 | 23 | 4 | 1143 |
| WBPU-H-POSS-4 | 3.0 | 81 | 24 | 5 | 1090 |

Figure 6:
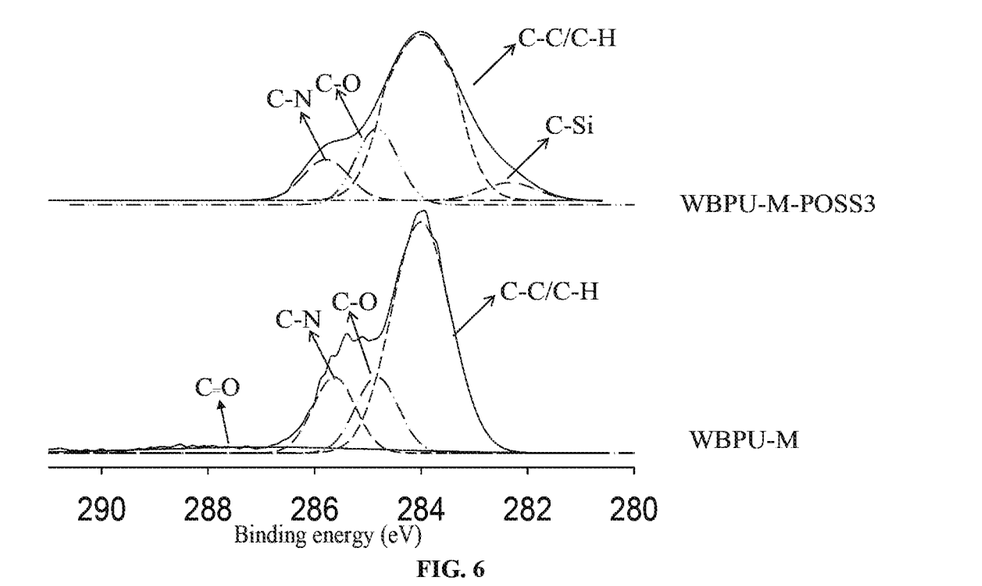
FIG. 6 is an overlay of curve fittings for XPS C1s core level spectra of waterborne polyurethane dispersions WBPU-M-POSS-3 and WBPU-M.

The mechanical performance of the WBPU-POSS coatings was evaluated by tensile test. The results are also summarized in Table 2. A typical stress-strain curve is shown in FIG. 4. The Young's modulus and tensile strength were observed to increase with increasing POSS concentrations, whereas the elongation at break (%) varied little initially and then decreased slightly with increasing POSS contents. The reinforcement effect of POSS cages leads to the changes in these mechanical properties [Eisenberg P, Erra-Balsells R, Ishikawa Y, Lucas J C, Nonami H, Williams R J J "Silsesquioxanes Derived from the Bulk Polycondensation of [3-(Methacryloxy)propyl]trimethoxysilane with Concentrated Formic Acid: Evolution of Molar Mass Distributions and Fraction of Intramolecular Cycles" Macromolecules 2002; 35: 1160-1174, incorporated herein by reference in its entirety]. The reinforcement of POSS has shown to restrict the deformation of polymer chains at defined stress, which was reflected by higher tensile strength and Young's modulus. POSS improved the mechanical properties up to a certain POSS content, which is ascribable to an adequate balance between POSS and other monomers unequal migrations of the soft and hard segments to the surface. The migration of different functional groups in the PU is reflected by their binding energies. The C1s at 285 eV binding energies of these functional groups are very similar and difficult to resolve without curve-fitting analysis. Therefore, these functional groups are combined and classified into five or six components: the C—Si group at 280.8-283.8 eV, the C=O carbon atom at 289:7-28.58 eV, the C—O group at 284.1-286.1 eV, the C—C or C—H moieties at 282.0-285.9 eV, the C—O group at 284.1-286.1 eV, and the C—N contributions at 284.5-287.1 eV (a typical deconvoluted spectrum is shown in FIG. 6). The peak at 280.8-283.8 eV recorded for certain coatings in L, M and H series (see Table 3). The peak appearance depends on the POSS and PTMG contents. The Si peak was not recorded with very small POSS and PTMG contents. The Si peak started to appear with increasing PTMG content. This confirmed that the Si enriched coatings could be obtained when there was a considerable amount of POSS and PTMG.

TABLE 3

Surface property and coating thickness at different interval

| Coating | Surface Si Enriched (By XPS Analysis) | Coating thickness (Before immersed) | Coating thickness (After immersed) | | |
|---|---|---|---|---|---|
| | | | 30 day | 60 day | 90 day |
| WBPU-L | No | 60 | 60 | 57 | 55 |
| WBPU-L-POSS-1 | No | 60 | 60 | 57 | 54 |
| WBPU-L-POSS-2 | No | 60 | 60 | 57 | 54 |
| WBPU-L-POSS-3 | No | 60 | 60 | 58 | 55 |
| WBPU-L-POSS-4 | Yes | 60 | 60 | 60 | 59 |
| WBPU-M | No | 60 | 60 | 58 | 56 |
| WBPU-M-POSS-1 | No | 60 | 59 | 59 | 57 |
| WBPU-M-POSS-2 | No | 60 | 59 | 59 | 58 |
| WBPU-M-POSS-3 | Yes | 60 | 60 | 60 | 59 |
| WBPU-M-POSS-4 | Yes | 60 | 60 | 60 | 60 |
| WBPU-H | No | 60 | 57 | 55 | Partially delaminated |
| WBPU-H-POSS-1 | No | 60 | 57 | 55 | Partially delaminated |
| WBPU-H-POSS-2 | Yes | 60 | 58 | 57 | Partially delaminated |
| WBPU-H-POSS-3 | Yes | 60 | 59 | 58 | Partially delaminated |
| WBPU-H-POSS-4 | Yes | 60 | 60 | 58 | Partially delaminated |

A primary goal of the POSS incorporation was the coating foul release property. However, it was necessary to check the self-polishing and delaminating behavior of the coatings as well because PU coatings are reported to erode/delaminated in marine environment [Rahman M M, Chun H H, Park H J "Waterborne polysiloxane-urethane-urea for potential marine coatings" Coat Technol 2011; 8: 389-399, incorporated herein by reference in its entirety]. The self-polishing and delaminating of the coatings are largely related to the coating polishing nature, which are depended on the surface composition and mechanical strength of the coating [Kim B W, Kang T W, Park H, Lee I W, Chun H H, Jo N J "Self polishing behavior of zinc based copolymer with different monomer composition" Mac Res 2014, 9: 978-982, incorporated herein by reference in its entirety]. The thickness changes of coatings under dynamic immersion testing are summarized in Table 3. The coatings exhibited a very light gradual decrease in thickness. The H series coating eroded quickly comparing to L and M series. Most importantly, a majority of the coatings in H series delaminated partially within 3 month. This implies that that the surface was connected strongly with bulk polymer in L and M series, protecting the surface from erosion as well as delaminating. As the coatings of H series delaminated within 3 month, the H series coatings were not considered for field test in real environment. In the meanwhile, L series coatings were not considered for field test as their surface was not Si enriched and therefore could not function as a foul release coating.

Figure 7A:
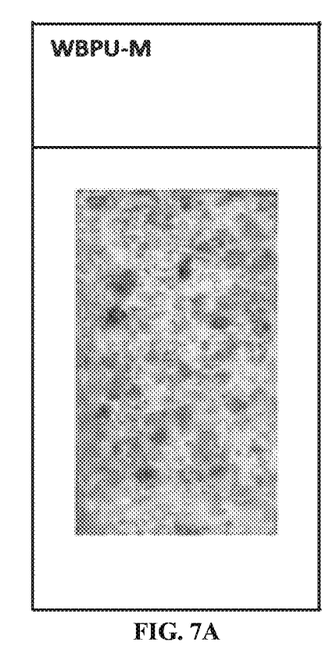
FIG. 7A is a photo of a coating based on waterborne polyurethane dispersion WBPU-M taken after immersion in marine environment for 3 months.
Figure 7B:
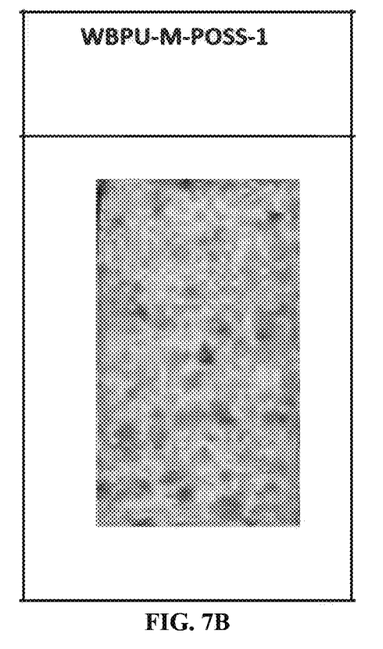
FIG. 7B is a photo of a coating based on waterborne polyurethane dispersion WBPU-M-POSS-1 taken after immersion in marine environment for 3 months.
Figure 7C:
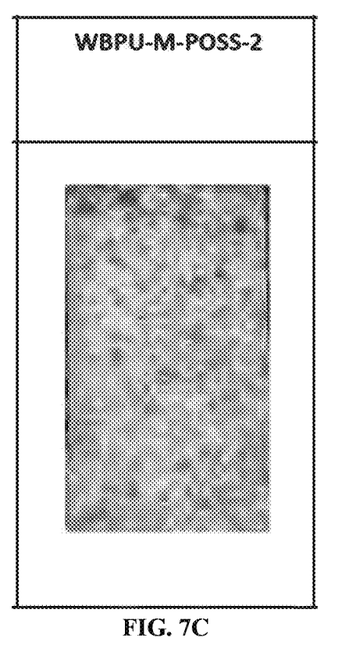
FIG. 7C is a photo of a coating based on waterborne polyurethane dispersion WBPU-M-POSS-2 taken after immersion in marine environment for 3 months.
Figure 7D:
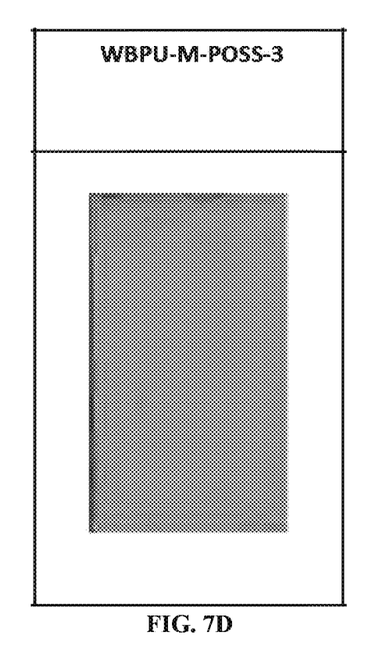
FIG. 7D is a photo of a coating based on waterborne polyurethane dispersion WBPU-M-POSS-3 taken after immersion in marine environment for 3 months.
Figure 7E:
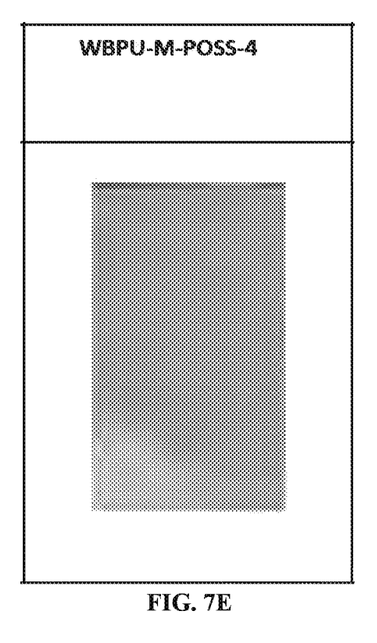
FIG. 7E is a photo of a coating based on waterborne polyurethane dispersion WBPU-M-POSS-4 taken after immersion in marine environment for 3 months.

To evaluate the feasibility of the use of these materials (only M series) as marine coatings, the PVC coated samples were subjected to real marine immersion testing. The antifouling performance was examined by visual inspection after defined intervals. Pictures samples after 90 days of immersion are presented in FIGS. 7A-E. The sample coated with pure WBPU was covered with marine fouling (FIG. 7A). However, the coatings incorporating the POSS exhibited a mixed character. With little amount of POSS content the coatings (WBPU-M-POSS-1 (FIG. 7B) and WBPU-M-POSS-2 (FIG. 7C)) showed a decreased growth rate of marine fouling, whereas, a good foul release was observed of other coatings (WBPU-M-POSS-3 (FIG. 7D) and WBPU-M-POSS-4 (FIG. 7E)). The WBPU-M-POSS-3 and WBPU-M-POSS-4 coatings are almost free of fouler. The present real field immersion studies showed that incorporating proper amounts of POSS could enhance the fouling-release properties when the POSS can move to the surface easily by maintaining a certain amount of PTMG content.

Example 7

In summary, waterborne polyurethane-polyhedral oligomericsilsesquioxane (WBPU-POSS) coatings were synthesized to create an environmentally friendly antifouling marine coating. Different contents of hydroxy terminated POSS were used in different WBPU compositions having various polyol contents. Specifically, WBPU-POSS coatings were prepared with various POSS contents in three defined WBPU compositions. Using higher PTMG (about 65 wt %) and POSS (above 0.0021 mole) contents, a Si enriched surface was achieved.

The structure of the coating was characterized by FT-IR and $^{29}$Si-NMR spectroscopic techniques. The mechanical properties of the films were characterized by tensile test. The coating surface was characterized by XPS technique. The mechanical strength of the coatings improved significantly with increasing POSS content, and optimum mechanical performance of the coatings was observed when the amount of POSS reached the highest among tested values. A preliminary mechanical/delaminated resistance of coating was evaluated based on the reduction in film thickness following artificial seawater immersion under a dynamic test condition.

WBPU-POSS coatings with a Si enriched surface were examined for antifouling activity in real environment. The WBPU-POSS coated PVC was immersed in sea water for 90 days and visually checked for antifouling performance. The antifouling property of the coatings also depends on POSS and PTMG content. Visually, it was observed that the antifouling property of the coatings increased with increasing POSS content. The coatings having approximately 0.0021 and 0.0028 mole of POSS and 65 wt % PTMG content (coatings WBPU-M-POSS-3 and WBPU-M-POSS-4) demonstrated good antifouling effect.

The invention claimed is:

1. A method of preparing a waterborne polyurethane dispersion, the method comprising:
   mixing a polyol and an acidic diol in a solvent to form a mixture;
   reacting a diisocyanate with the mixture to form an acidic prepolymer;
   mixing a hydroxy functionalized polyhedral oligomeric silsesquioxane and a base with the prepolymer to form a neutralized prepolymer; and
   mixing the neutralized prepolymer with a chain extender in water thereby forming the waterborne polyurethane dispersion,
   wherein the chain extender is a diamine.

2. The method of claim 1, wherein the reacting is catalyzed by an organotin compound.

3. The method of claim 1, wherein the polyol is at least one selected from the group consisting of poly(tetramethylene oxide) glycol, polypropylene glycol, and polyethylene glycol.

4. The method of claim 1, wherein the polyol has a number average molecular weight of 500-3,000 g/mol.

5. The method of claim 1, wherein the acidic diol is dimethylol propionic acid, 2,2-bis(hydroxymethyl)butyric acid, or both.

6. The method of claim 1, wherein the diisocyanate is at least one selected from the group consisting of 4,4'-dicyclohexylmethane diisocyanate, isophorone diisocyanate, hexamethylene diisocyanate, methylene diphenyl diisocyanate, and toluene diisocyanate.

7. The method of claim 1, wherein the hydroxy functionalized polyhedral oligomeric silsesquioxane comprises disilanolisobutyl polyhedral oligomeric silsesquioxane.

8. The method of claim 1, wherein a weight ratio of the polyol to a total weight of the acidic diol, the hydroxy functionalized polyhedral oligomeric silsesquioxane, the diisocyanate, and the chain extender is in a range of 1:1 to 3:1.

9. The method of claim 1, wherein a molar ratio of the polyol to the hydroxy functionalized polyhedral oligomeric silsesquioxane is in a range of 5:1 to 100:1.

10. The method of claim 1, wherein a molar ratio of the acidic diol to a total molar amount of the polyol and the hydroxy functionalized polyhedral oligomeric silsesquioxane is in a range of 1:1 to 3:1.

11. The method of claim 1, wherein a molar ratio of the diisocyanate to a total molar amount of the polyol, the hydroxy functionalized polyhedral oligomeric silsesquioxane, the acidic diol, and the chain extender is in a range of 1:2 to 2:1.

12. The method of claim 1, wherein the waterborne polyurethane dispersion comprises:
   a polyurethane comprising reacted units of the polyol, the acidic diol, the hydroxy functionalized polyhedral oligomeric silsesquioxane, the diisocyanate, and the chain extender; and
   40-80 wt % water relative to a total weight of the waterborne polyurethane dispersion.

* * * * *